(12) United States Patent
Cheng

(10) Patent No.: US 9,618,349 B2
(45) Date of Patent: Apr. 11, 2017

(54) NAVIGATION SYSTEM WITH MODE MECHANISM AND METHOD OF OPERATION THEREOF

(71) Applicant: Telenav, Inc., Sunnyvale, CA (US)

(72) Inventor: Xinan Cheng, Sunnyvale, CA (US)

(73) Assignee: Telenav, Inc., Santa Clara, CA (US)

( * ) Notice: Subject to any disclaimer, the term of this patent is extended or adjusted under 35 U.S.C. 154(b) by 0 days.

(21) Appl. No.: 14/341,622

(22) Filed: Jul. 25, 2014

(65) Prior Publication Data

US 2016/0025504 A1 Jan. 28, 2016

(51) Int. Cl.
*G01C 21/00* (2006.01)
*G01C 21/34* (2006.01)

(52) U.S. Cl.
CPC .................... *G01C 21/3423* (2013.01)

(58) Field of Classification Search
None
See application file for complete search history.

(56) References Cited

U.S. PATENT DOCUMENTS

| | | | |
|---|---|---|---|
| 8,320,939 B1 | 11/2012 | Vincent | |
| 2009/0177387 A1 | 7/2009 | Liu | |
| 2009/0187340 A1 | 7/2009 | Vavrus et al. | |
| 2010/0121514 A1* | 5/2010 | Kato | B60K 6/48 701/22 |
| 2010/0125409 A1 | 5/2010 | Prehofer | |
| 2011/0270654 A1 | 11/2011 | Banerjee et al. | |
| 2012/0150436 A1* | 6/2012 | Rossano | G01C 21/3694 701/450 |
| 2012/0289254 A1* | 11/2012 | Dishneau | G06Q 10/1097 455/456.3 |
| 2013/0317735 A1* | 11/2013 | Mann | G01C 21/3697 701/400 |
| 2014/0365105 A1* | 12/2014 | Kono | G01C 21/3469 701/123 |
| 2015/0066271 A1* | 3/2015 | Ogawa | B60L 7/14 701/22 |
| 2015/0100237 A1* | 4/2015 | Zhao | G01C 21/3641 701/532 |
| 2015/0177019 A1* | 6/2015 | Baig | G01C 21/3694 701/532 |

* cited by examiner

*Primary Examiner* — Adam Alharbi
(74) *Attorney, Agent, or Firm* — IP Investment Law Group

(57) ABSTRACT

A method of operation of a navigation system includes: determining a travel condition for traveling from a start location to a waypoint; determining a navigation mode based on the travel condition by comparing a travel distance, from the start location to the waypoint, to a distance threshold for selecting a mode type; and generating a travel route with a control unit based on the navigation mode for displaying on a device.

20 Claims, 6 Drawing Sheets

NAVIGATION SYSTEM WITH MODE MECHANISM AND METHOD OF OPERATION THEREOF

TECHNICAL FIELD

The present invention relates generally to a navigation system, and more particularly to a system with mode mechanism.

BACKGROUND ART

Modern portable consumer and industrial electronics, especially client devices such as navigation systems, cellular phones, portable digital assistants, and combination devices, are providing increasing levels of functionality to support modern life including location-based information services. Research and development in the existing technologies can take a myriad of different directions.

As users become more empowered with the growth of mobile location based service devices, new and old paradigms begin to take advantage of this new device space. There are many technological solutions to take advantage of this new device location opportunity. One existing approach is to use location information to provide navigation services such as a global positioning system (GPS) for a car or on a mobile device such as a cell phone, portable navigation device (PND) or a personal digital assistant (PDA).

Location based services allow users to create, transfer, store, and/or consume information in order for users to create, transfer, store, and consume in the "real world." One such use of location based services is to efficiently transfer or route users to the desired destination or service.

Navigation systems and location based services enabled systems have been incorporated in automobiles, notebooks, handheld devices, and other portable products. Today, these systems aid users by incorporating available, real-time relevant information, such as maps, directions, local businesses, or other points of interest (POI). The real-time information provides invaluable relevant information.

However, a navigation system without mode mechanism to switch for guidance relevant to the user has become a paramount concern for the consumer. The inability decreases the benefit of using the tool.

Thus, a need still remains for a navigation system with mode mechanism to provide guidance optimal to the user. In view of the increasing mobility of the workforce and social interaction, it is increasingly critical that answers be found to these problems. In view of the ever-increasing commercial competitive pressures, along with growing consumer expectations and the diminishing opportunities for meaningful product differentiation in the marketplace, it is critical that answers be found for these problems. Additionally, the need to reduce costs, improve efficiencies and performance, and meet competitive pressures adds an even greater urgency to the critical necessity for finding answers to these problems. Solutions to these problems have been long sought but prior developments have not taught or suggested any solutions and, thus, solutions to these problems have long eluded those skilled in the art.

DISCLOSURE OF THE INVENTION

The present invention provides a method of operation of a navigation system including: determining a travel condition for traveling from a start location to a waypoint; determining a navigation mode based on the travel condition by comparing a travel distance, from the start location to the waypoint, to a distance threshold for selecting a mode type; and generating a travel route with a control unit based on the navigation mode for displaying on a device.

The present invention provides a navigation system, including: a control unit for: determining a travel condition for traveling from a start location to a waypoint, determining a navigation mode based on the travel condition by comparing a travel distance, from the start location to the waypoint, to a distance threshold for selecting a mode type, generating a travel route based on the navigation mode, and a communication interface, coupled to the control unit, for communicating the travel route for displaying on a device.

The present invention provides a navigation system having a non-transitory computer readable medium including instructions for execution, the instructions comprising: determining a travel condition for traveling from a start location to a waypoint; determining a navigation mode based on the travel condition by comparing a travel distance, from the start location to the waypoint, to a distance threshold for selecting a mode type; and generating a travel route based on the navigation mode for displaying on a device.

Certain embodiments of the invention have other steps or elements in addition to or in place of those mentioned above. The steps or element will become apparent to those skilled in the art from a reading of the following detailed description when taken with reference to the accompanying drawings.

BEST MODE FOR CARRYING OUT THE INVENTION

Figure 1:
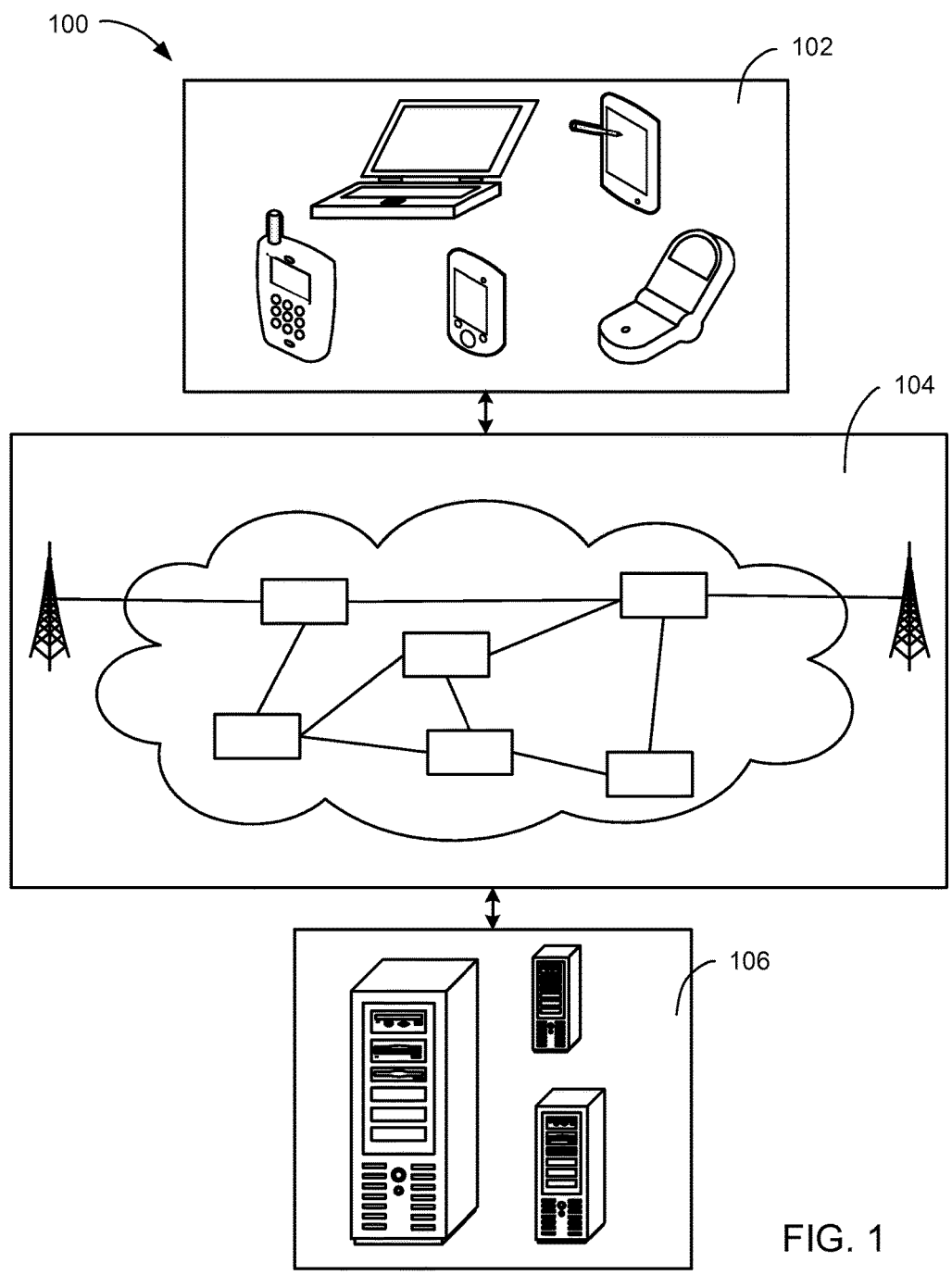
FIG. 1 is a navigation system with mode mechanism in an embodiment of the present invention.

The following embodiments are described in sufficient detail to enable those skilled in the art to make and use the invention. It is to be understood that other embodiments would be evident based on the present disclosure, and that system, process, or mechanical changes may be made without departing from the scope of the present invention.

In the following description, numerous specific details are given to provide a thorough understanding of the invention. However, it will be apparent that the invention may be practiced without these specific details. In order to avoid obscuring the present invention, some well-known circuits, system configurations, and process steps are not disclosed in detail.

The drawings showing embodiments of the navigation system 100 are semi-diagrammatic and not to scale and, particularly, some of the dimensions are for the clarity of presentation and are shown exaggerated in the drawing FIGS. Similarly, although the views in the drawings for ease of description generally show similar orientations, this depiction in the FIGs. is arbitrary for the most part. Generally, the invention can be operated in any orientation. The embodiments have been numbered first embodiment, second embodiment, etc. as a matter of descriptive convenience and are not intended to have any other significance or provide limitations for the present invention.

One skilled in the art would appreciate that the format with which navigation information is expressed is not critical to some embodiments of the invention. For example, in some embodiments, navigation information is presented in the format of (X, Y), where X and Y are two ordinates that define the geographic location, i.e., a position of a user.

In an alternative embodiment, navigation information is presented by longitude and latitude related information. In a further embodiment of the present invention, the navigation information also includes a velocity element including a speed component and a heading component.

The term "relevant information" referred to herein includes the navigation information described as well as information relating to points of interest to the user, such as local business, hours of businesses, types of businesses, advertised specials, traffic information, maps, local events, and nearby community or personal information.

The term "module" referred to herein can include software, hardware, or a combination thereof in the present invention in accordance with the context in which the term is used. For example, the software can be machine code, firmware, embedded code, and application software. Also for example, the hardware can be circuitry, processor, computer, integrated circuit, integrated circuit cores, a pressure sensor, an inertial sensor, a microelectromechanical system (MEMS), passive devices, or a combination thereof.

Referring now to FIG. 1, therein is shown a navigation system 100 with mode mechanism in an embodiment of the present invention. The navigation system 100 includes a first device 102, such as a client or a server, connected to a second device 106, such as a client or server, with a communication path 104, such as a wireless or wired network.

For example, the first device 102 can be of any of a variety of mobile devices, such as a cellular phone, personal digital assistant, a notebook computer, automotive telematic navigation system, or other multi-functional mobile communication or entertainment device. The first device 102 can be a standalone device, or can be incorporated with a vehicle, for example a car, truck, bus, or train. The first device 102 can couple to the communication path 104 to communicate with the second device 106.

For illustrative purposes, the navigation system 100 is described with the first device 102 as a mobile computing device, although it is understood that the first device 102 can be different types of computing devices. For example, the first device 102 can also be a non-mobile computing device, such as a server, a server farm, or a desktop computer. In another example, the first device 102 can be a particularized machine, such as a mainframe, a server, a cluster server, rack mounted server, or a blade server, or as more specific examples, an IBM System z10™ Business Class mainframe or a HP ProLiant ML™ server.

The second device 106 can be any of a variety of centralized or decentralized computing devices. For example, the second device 106 can be a computer, grid computing resources, a virtualized computer resource, cloud computing resource, routers, switches, peer-to-peer distributed computing devices, or a combination thereof.

The second device 106 can be centralized in a single computer room, distributed across different rooms, distributed across different geographical locations, embedded within a telecommunications network. The second device 106 can have a means for coupling with the communication path 104 to communicate with the first device 102. The second device 106 can also be a client type device as described for the first device 102. Another example, the first device 102 or the second device 106 can be a particularized machine, such as a portable computing device, a thin client, a notebook, a netbook, a smartphone, a tablet, a personal digital assistant, or a cellular phone, and as specific examples, an Apple iPhone™, Android™ smartphone, or Windows™ platform smartphone.

For illustrative purposes, the navigation system 100 is described with the second device 106 as a non-mobile computing device, although it is understood that the second device 106 can be different types of computing devices. For example, the second device 106 can also be a mobile computing device, such as notebook computer, another client device, or a different type of client device. The second device 106 can be a standalone device, or can be incorporated with a vehicle, for example a car, truck, bus, or train.

Also for illustrative purposes, the navigation system 100 is shown with the second device 106 and the first device 102 as end points of the communication path 104, although it is understood that the navigation system 100 can have a different partition between the first device 102, the second device 106, and the communication path 104. For example, the first device 102, the second device 106, or a combination thereof can also function as part of the communication path 104.

The communication path 104 can be a variety of networks. For example, the communication path 104 can include wireless communication, wired communication, optical, ultrasonic, or the combination thereof. Satellite communication, cellular communication, Bluetooth, Infrared Data Association standard (IrDA), wireless fidelity (WiFi), and worldwide interoperability for microwave access (WiMAX) are examples of wireless communication that can be included in the communication path 104. Ethernet, digital subscriber line (DSL), fiber to the home (FTTH), and plain old telephone service (POTS) are examples of wired communication that can be included in the communication path 104.

Further, the communication path 104 can traverse a number of network topologies and distances. For example, the communication path 104 can include direct connection, personal area network (PAN), local area network (LAN), metropolitan area network (MAN), wide area network (WAN) or any combination thereof.

Figure 2:
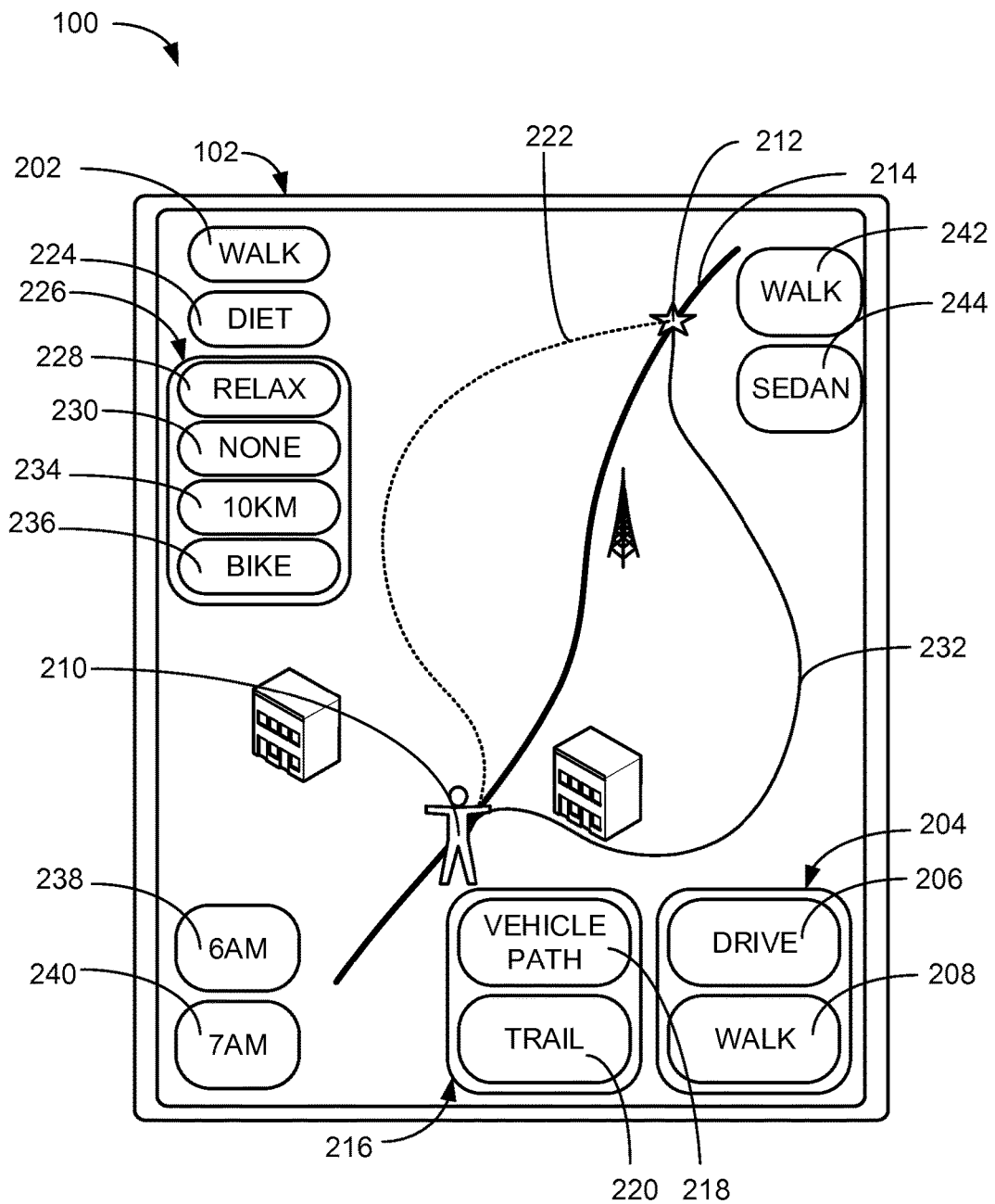
FIG. 2 is an example of a navigation mode of the navigation system.

Referring now to FIG. 2, there is shown an example of a navigation mode 202 of the navigation system 100. For clarity and brevity, the discussion of the embodiment of the present invention will focus on the first device 102 delivering the result generated by the navigation system 100. However, the second device 106 of FIG. 1 and the first device 102 can be discussed interchangeably.

The navigation mode 202 is defined as a designated state of the navigation system 100 to provide navigation information. For example, the navigation mode 202 can include a mode type 204, which is defined as a categorization of the navigation mode 202. The mode type 204 can include a vehicle mode 206, a pedestrian mode 208, or a combination thereof. The vehicle mode 206 is defined as the navigation mode 202 for providing the navigation information based on an operation of a vehicle.

For example, the navigation system 100 can operate in the vehicle mode 206 if the user of the navigation system 100 is operating an automobile. The pedestrian mode 208 is defined as the navigation mode 202 for providing the navigation information based on non-operation of a vehicle.

For example, the navigation system 100 can operate in the pedestrian mode 208 if the user of the navigation system 100 is walking, running, or a combination thereof.

A start location 210 is defined as a physical location where the user's travel begins. For example, the start location 210 can represent the current location of the first device 102. For another example, the start location n210 can represent a designated location to start the user's travel. A waypoint 212 is defined as a physical location where user's travel stops. For example, the waypoint 212 can represent an intermediate destination, a final destination, or a combination thereof.

A travel route 214 is defined as a path from the start location 210 to the waypoint 212. The navigation system 100 can provide a route option 216 for the travel route 214. The route option 216 is defined as a path choice for the user's travel. The route option 216 can include a vehicle route 218, a pedestrian route 220, or a combination thereof. The vehicle route 218 is defined as a path for operating a vehicle for the user's travel. The pedestrian route 220 is defined as a path for the user's travel without operating a vehicle. The pedestrian route 220 can include a fitness route 222, which is defined as a path when a travel purpose 224 is for exercising to improve health. The travel purpose 224 is an objective of the user's travel.

A travel condition 226 is defined as factors surrounding the user's travel. For example, the navigation system 100 can consider the travel condition 226 to determine the mode type 204 of the navigation mode 202. The travel condition 226 can include a travel context 228, which is defined as a situation, circumstance, or a combination thereof surrounding the first device 102.

Furthermore, the travel condition 226 can include a traffic condition 230, a candidate route 232, a travel distance 234, a travel option 236, a departure time 238, an arrival time 240, a travel mode 242, a vehicle type 244, or a combination thereof. The traffic condition 230 is defined as a state of vehicle movement, human movement, traffic regulation, or a combination thereof on a path. For example, the candidate route 232 from the start location 210 to the waypoint 212 can have the traffic condition 230 of heavy traffic.

The candidate route 232 is defined as a choice for a path. For example, the travel route 214 can be generated from the candidate route 232 representing a path from the start location 210 to the waypoint 212. A travel distance 234 is defined as a physical length of a path. For example, the travel distance 234 between the start location 210 and the waypoint can be 10 kilometers (KM).

The travel option 236 is defined as a choice of a travel method. For example, the travel option 236 can represent taking a public transportation, such as a bus, train, ferry, or a combination thereof, to reach the waypoint 212 representing a target destination.

The departure time 238 is defined as the time of day leaving the start location 210. The arrival time 240 is defined as the time of day reaching the waypoint 212. The travel mode 242 is defined as the travel method. For example, the travel mode 242 can represent the public transportation to the waypoint 212. A vehicle type 244 is a categorization of a vehicle having the navigation system 100.

Figure 3:
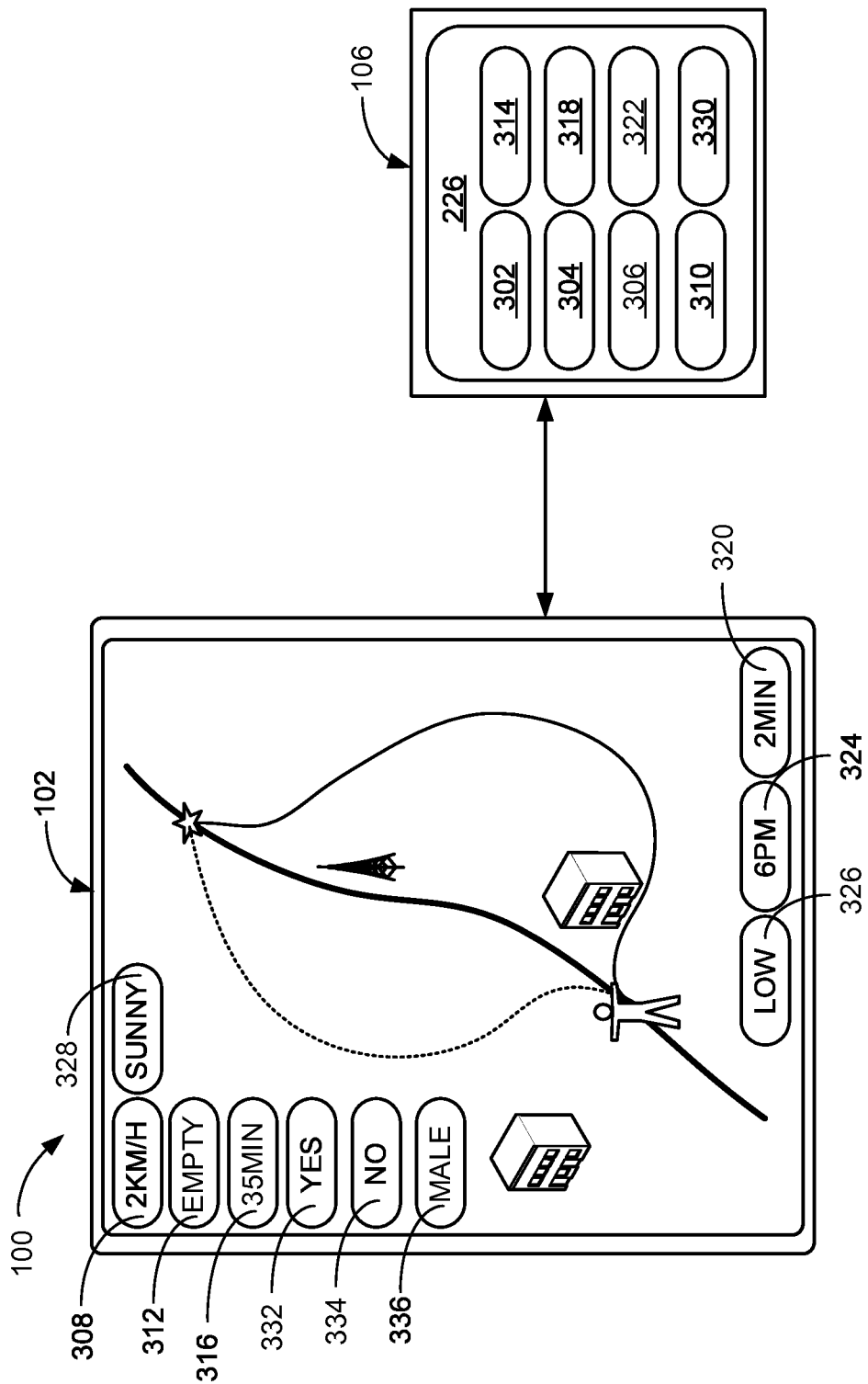
FIG. 3 is further examples of the travel condition.

Referring now to FIG. 3, there is shown further examples of the travel condition 226. The first device 102 and the second device 106 can communicate to exchange the travel condition 226. An activity history 302 is defined as past log of the user's activity. For example, the activity history 302 can indicate that the user walked to the waypoint 212 of FIG. 2 representing a park on Sunday. A user's schedule 304 is defined as a series of activity planned for a specific time period. For example, the user's schedule 304 can indicate that the user has a meeting every Thursday morning.

A distance threshold 306 is defined as a distance limit. For example, the distance threshold 306 for changing the mode type 204 of FIG. 2 from the pedestrian mode 208 of FIG. 2 to the vehicle mode 206 of FIG. 2 can represent 1 KM. The distance threshold 306 can represent the minimum distance limit or the maximum distance limit. A travel speed 308 is defined as a rate of motion for the user's travel. For example, the travel speed 308 can be represented as kilometers per hour (KM/H). A speed threshold 310 is defined as a maximum speed. For example, the speed threshold 310 can represent a speed limit. For a different example, the speed threshold 310 can represent a user defined speed of vehicle traveling in traffic.

A fuel condition 312 is defined as a level of remaining fuel in the user's vehicle. For example, the fuel condition 312 can represent an amount of gasoline, electric charge, hydrogen fuel, biofuel, or a combination thereof remaining in the vehicle. A fuel threshold 314 is defined as a minimum required amount of fuel.

A travel duration 316 is an amount of time required to complete the user's travel. For example, the travel duration 316 for traversing the travel route 214 of FIG. 2 can represent 35 minutes. A duration threshold 318 is defined as maximum allotted time for the user's travel. A duration difference 320 is defined as a difference between one instance of the travel duration 316 and another instance of the travel duration 316. A difference threshold 322 is defined as a maximum allotted time difference between the instances of the duration difference 320.

A time of day threshold 324 is defined as a set time in the day. For example, the navigation system 100 can change the mode type 204 from pedestrian mode 208 to the vehicle mode 206 after the time of day threshold 324 representing a sunset. A crime level 326 is defined as a level of criminal activity within a geographic area.

A weather condition 328 is defined as a state of climate. For example, the weather condition 328 can represent the state of climate surrounding the first device 102, the start location 210, the waypoint 212, or a combination thereof. The weather condition 328 can include the precipitation level, temperature, humidity, gust level, or a combination thereof. A weather threshold 330 is defined as minimum level of the weather condition 328. For example, the weather threshold 330 can represent 30 degrees Celsius.

A pedestrian accessibility 332 is defined as an availability for traveling by foot. For example, a street can have the pedestrian accessibility 332 if the street has a sidewalk. In contrast, a highway may not have the pedestrian accessibility 332 because the highway may not provide the sidewalk for people to walk on. A parking availability 334 is defined as a possibility for the parking a vehicle. For example, the parking availability 334 can represent the possibility to park the vehicle at the waypoint 212 of FIG. 2, to re-park at the start location 210 of FIG. 2, or a combination thereof.

A user profile 336 is defined as a user's information. For example, the user profile 336 can include age, gender, profession, medical information, or a combination thereof. For further example, the user profile 336 can include various thresholds discussed above.

Figure 4:
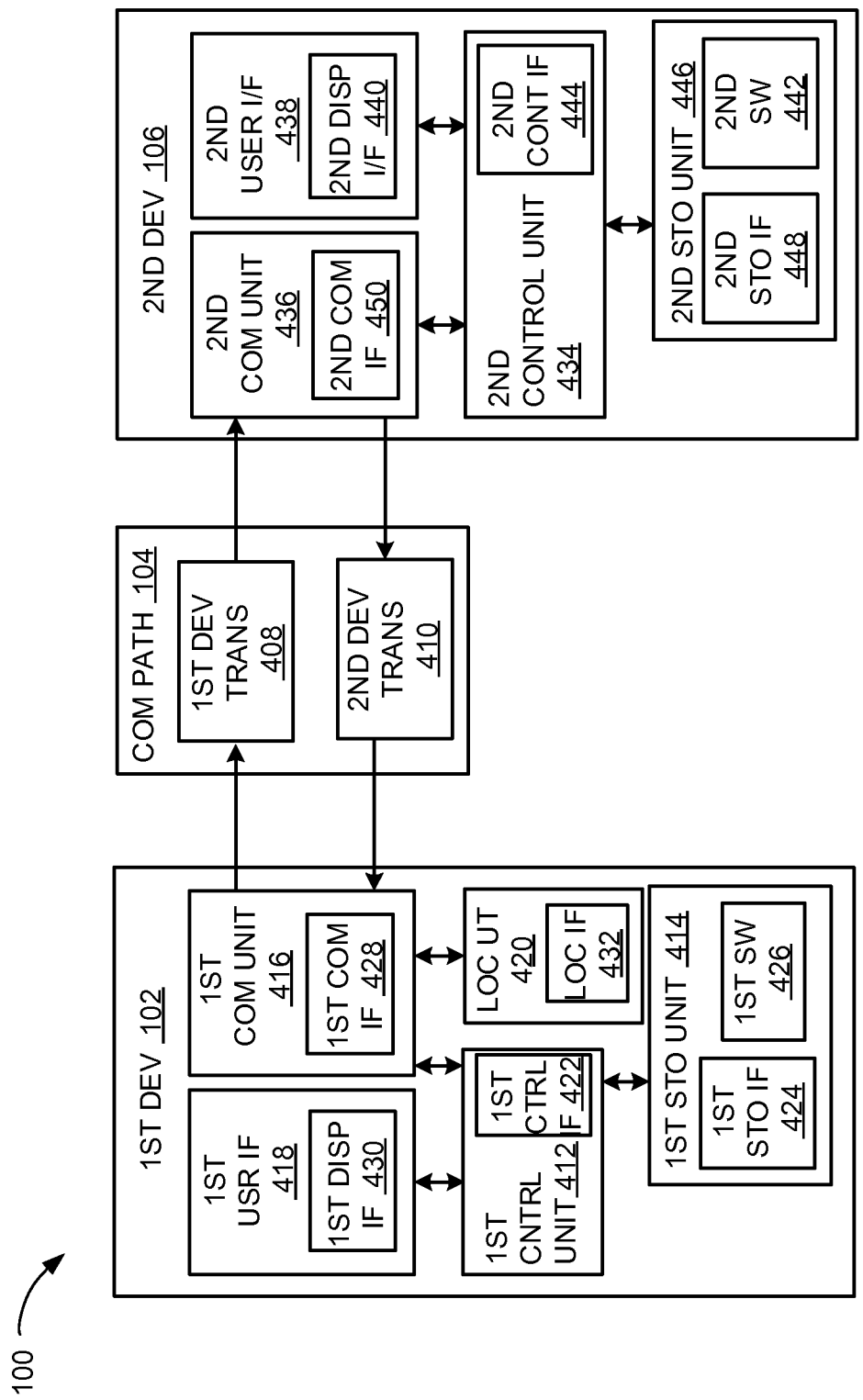
FIG. 4 is an exemplary block diagram of the navigation system.

Referring now to FIG. 4, therein is shown an exemplary block diagram of the navigation system 100. The navigation system 100 can include the first device 102, the communication path 104, and the second device 106. The first device 102 can send information in a first device transmission 408 over the communication path 104 to the second device 106.

The second device 106 can send information in a second device transmission 410 over the communication path 104 to the first device 102.

For illustrative purposes, the navigation system 100 is shown with the first device 102 as a client device, although it is understood that the navigation system 100 can have the first device 102 as a different type of device. For example, the first device 102 can be a server.

Also for illustrative purposes, the navigation system 100 is shown with the second device 106 as a server, although it is understood that the navigation system 100 can have the second device 106 as a different type of device. For example, the second device 106 can be a client device.

For brevity of description in this embodiment of the present invention, the first device 102 will be described as a client device and the second device 106 will be described as a server device. The present invention is not limited to this selection for the type of devices. The selection is an example of the present invention.

The first device 102 can include a first control unit 412, a first storage unit 414, a first communication unit 416, a first user interface 418, and a location unit 420. The first control unit 412 can include a first control interface 422. The first control unit 412 can execute a first software 426 to provide the intelligence of the navigation system 100. The first control unit 412 can be implemented in a number of different manners. For example, the first control unit 412 can be a processor, an embedded processor, a microprocessor, a hardware control logic, a hardware finite state machine (FSM), a digital signal processor (DSP), or a combination thereof. The first control interface 422 can be used for communication between the first control unit 412 and other functional units in the first device 102. The first control interface 422 can also be used for communication that is external to the first device 102.

The first control interface 422 can receive information from the other functional units or from external sources, or can transmit information to the other functional units or to external destinations. The external sources and the external destinations refer to sources and destinations physically separate from the first device 102.

The first control interface 422 can be implemented in different ways and can include different implementations depending on which functional units or external units are being interfaced with the first control interface 422. For example, the first control interface 422 can be implemented with a pressure sensor, an inertial sensor, a microelectromechanical system (MEMS), optical circuitry, waveguides, wireless circuitry, wireline circuitry, or a combination thereof.

The location unit 420 can generate location information, current heading, and current speed of the first device 102, as examples. The location unit 420 can be implemented in many ways. For example, the location unit 420 can function as at least a part of a global positioning system (GPS), an inertial navigation system, a cellular-tower location system, a pressure location system, or any combination thereof.

The location unit 420 can include a location interface 432. The location interface 432 can be used for communication between the location unit 420 and other functional units in the first device 102. The location interface 432 can also be used for communication that is external to the first device 102.

The location interface 432 can receive information from the other functional units or from external sources, or can transmit information to the other functional units or to external destinations. The external sources and the external destinations refer to sources and destinations physically separate from the first device 102.

The location interface 432 can include different implementations depending on which functional units or external units are being interfaced with the location unit 420. The location interface 432 can be implemented with technologies and techniques similar to the implementation of the first control interface 422.

The first storage unit 414 can store the first software 426. The first storage unit 414 can also store the relevant information, such as advertisements, points of interest (POI), navigation routing entries, or any combination thereof.

The first storage unit 414 can be a volatile memory, a nonvolatile memory, an internal memory, an external memory, or a combination thereof. For example, the first storage unit 414 can be a nonvolatile storage such as non-volatile random access memory (NVRAM), Flash memory, disk storage, or a volatile storage such as static random access memory (SRAM).

The first storage unit 414 can include a first storage interface 424. The first storage interface 424 can be used for communication between the location unit 420 and other functional units in the first device 102. The first storage interface 424 can also be used for communication that is external to the first device 102.

The first storage interface 424 can receive information from the other functional units or from external sources, or can transmit information to the other functional units or to external destinations. The external sources and the external destinations refer to sources and destinations physically separate from the first device 102.

The first storage interface 424 can include different implementations depending on which functional units or external units are being interfaced with the first storage unit 414. The first storage interface 424 can be implemented with technologies and techniques similar to the implementation of the first control interface 422.

The first communication unit 416 can enable external communication to and from the first device 102. For example, the first communication unit 416 can permit the first device 102 to communicate with the second device 106, an attachment, such as a peripheral device or a computer desktop, and the communication path 104.

The first communication unit 416 can also function as a communication hub allowing the first device 102 to function as part of the communication path 104 and not limited to be an end point or terminal unit to the communication path 104. The first communication unit 416 can include active and passive components, such as microelectronics or an antenna, for interaction with the communication path 104.

The first communication unit 416 can include a first communication interface 428. The first communication interface 428 can be used for communication between the first communication unit 416 and other functional units in the first device 102. The first communication interface 428 can receive information from the other functional units or can transmit information to the other functional units.

The first communication interface 428 can include different implementations depending on which functional units are being interfaced with the first communication unit 416. The first communication interface 428 can be implemented with technologies and techniques similar to the implementation of the first control interface 422.

The first user interface 418 allows a user (not shown) to interface and interact with the first device 102. The first user interface 418 can include an input device and an output device. Examples of the input device of the first user interface 418 can include a keypad, a touchpad, soft-keys, a keyboard, a microphone, a camera, or any combination thereof to provide data and communication inputs.

The first user interface 418 can include a first display interface 430. The first display interface 430 can include a display, a projector, a video screen, a speaker, a headset, or any combination thereof.

The first control unit 412 can operate the first user interface 418 to display information generated by the navigation system 100. The first control unit 412 can also execute the first software 426 for the other functions of the navigation system 100, including receiving location information from the location unit 420. The first control unit 412 can further execute the first software 426 for interaction with the communication path 104 via the first communication unit 416.

The second device 106 can be optimized for implementing the present invention in a multiple device embodiment with the first device 102. The second device 106 can provide the additional or higher performance processing power compared to the first device 102. The second device 106 can include a second control unit 434, a second communication unit 436, and a second user interface 438.

The second user interface 438 allows a user (not shown) to interface and interact with the second device 106. The second user interface 438 can include an input device and an output device. Examples of the input device of the second user interface 438 can include a keypad, a touchpad, soft-keys, a keyboard, a microphone, a camera, or any combination thereof to provide data and communication inputs. Examples of the output device of the second user interface 438 can include a second display interface 440. The second display interface 440 can include a display, a projector, a video screen, a speaker, a headset, or any combination thereof.

The second control unit 434 can execute a second software 442 to provide the intelligence of the second device 106 of the navigation system 100. The second software 442 can operate in conjunction with the first software 426. The second control unit 434 can provide additional performance compared to the first control unit 412.

The second control unit 434 can operate the second user interface 438 to display information. The second control unit 434 can also execute the second software 442 for the other functions of the navigation system 100, including operating the second communication unit 436 to communicate with the first device 102 over the communication path 104.

The second control unit 434 can be implemented in a number of different manners. For example, the second control unit 434 can be a processor, an embedded processor, a microprocessor, a hardware control logic, a hardware finite state machine (FSM), a digital signal processor (DSP), or a combination thereof.

The second control unit 434 can include a second control interface 444. The second control interface 444 can be used for communication between the second control unit 434 and other functional units in the second device 106. The second control interface 444 can also be used for communication that is external to the second device 106.

The second control interface 444 can receive information from the other functional units or from external sources, or can transmit information to the other functional units or to external destinations. The external sources and the external destinations refer to sources and destinations physically separate from the second device 106.

The second control interface 444 can be implemented in different ways and can include different implementations depending on which functional units or external units are being interfaced with the second control interface 444. For example, the second control interface 444 can be implemented with a pressure sensor, an inertial sensor, a microelectromechanical system (MEMS), optical circuitry, waveguides, wireless circuitry, wireline circuitry, or a combination thereof.

A second storage unit 446 can store the second software 442. The second storage unit 446 can also store the relevant information, such as advertisements, points of interest (POI), navigation routing entries, or any combination thereof. The second storage unit 446 can be sized to provide the additional storage capacity to supplement the first storage unit 414.

For illustrative purposes, the second storage unit 446 is shown as a single element, although it is understood that the second storage unit 446 can be a distribution of storage elements. Also for illustrative purposes, the navigation system 100 is shown with the second storage unit 446 as a single hierarchy storage system, although it is understood that the navigation system 100 can have the second storage unit 446 in a different configuration. For example, the second storage unit 446 can be formed with different storage technologies forming a memory hierarchal system including different levels of caching, main memory, rotating media, or off-line storage.

The second storage unit 446 can be a volatile memory, a nonvolatile memory, an internal memory, an external memory, or a combination thereof. For example, the second storage unit 446 can be a nonvolatile storage such as non-volatile random access memory (NVRAM), Flash memory, disk storage, or a volatile storage such as static random access memory (SRAM).

The second storage unit 446 can include a second storage interface 448. The second storage interface 448 can be used for communication between the location unit 420 and other functional units in the second device 106. The second storage interface 448 can also be used for communication that is external to the second device 106.

The second storage interface 448 can receive information from the other functional units or from external sources, or can transmit information to the other functional units or to external destinations. The external sources and the external destinations refer to sources and destinations physically separate from the second device 106.

The second storage interface 448 can include different implementations depending on which functional units or external units are being interfaced with the second storage unit 446. The second storage interface 448 can be implemented with technologies and techniques similar to the implementation of the second control interface 444.

The second communication unit 436 can enable external communication to and from the second device 106. For example, the second communication unit 436 can permit the second device 106 to communicate with the first device 102 over the communication path 104.

The second communication unit 436 can also function as a communication hub allowing the second device 106 to function as part of the communication path 104 and not limited to be an end point or terminal unit to the communication path 104. The second communication unit 436 can include active and passive components, such as microelectronics or an antenna, for interaction with the communication path 104.

The second communication unit 436 can include a second communication interface 450. The second communication interface 450 can be used for communication between the second communication unit 436 and other functional units in the second device 106. The second communication interface 450 can receive information from the other functional units or can transmit information to the other functional units.

The second communication interface 450 can include different implementations depending on which functional units are being interfaced with the second communication unit 436. The second communication interface 450 can be implemented with technologies and techniques similar to the implementation of the second control interface 444.

The first communication unit 416 can couple with the communication path 104 to send information to the second device 106 in the first device transmission 408. The second device 106 can receive information in the second communication unit 436 from the first device transmission 408 of the communication path 104.

The second communication unit 436 can couple with the communication path 104 to send information to the first device 102 in the second device transmission 410. The first device 102 can receive information in the first communication unit 416 from the second device transmission 410 of the communication path 104. The navigation system 100 can be executed by the first control unit 412, the second control unit 434, or a combination thereof.

For illustrative purposes, the second device 106 is shown with the partition having the second user interface 438, the second storage unit 446, the second control unit 434, and the second communication unit 436, although it is understood that the second device 106 can have a different partition. For example, the second software 442 can be partitioned differently such that some or all of its function can be in the second control unit 434 and the second communication unit 436. Also, the second device 106 can include other functional units not shown in FIG. 4 for clarity.

The functional units in the first device 102 can work individually and independently of the other functional units. The first device 102 can work individually and independently from the second device 106 and the communication path 104.

The functional units in the second device 106 can work individually and independently of the other functional units. The second device 106 can work individually and independently from the first device 102 and the communication path 104.

For illustrative purposes, the navigation system 100 is described by operation of the first device 102 and the second device 106. It is understood that the first device 102 and the second device 106 can operate any of the modules and functions of the navigation system 100. For example, the first device 102 is described to operate the location unit 420, although it is understood that the second device 106 can also operate the location unit 420.

Figure 5:
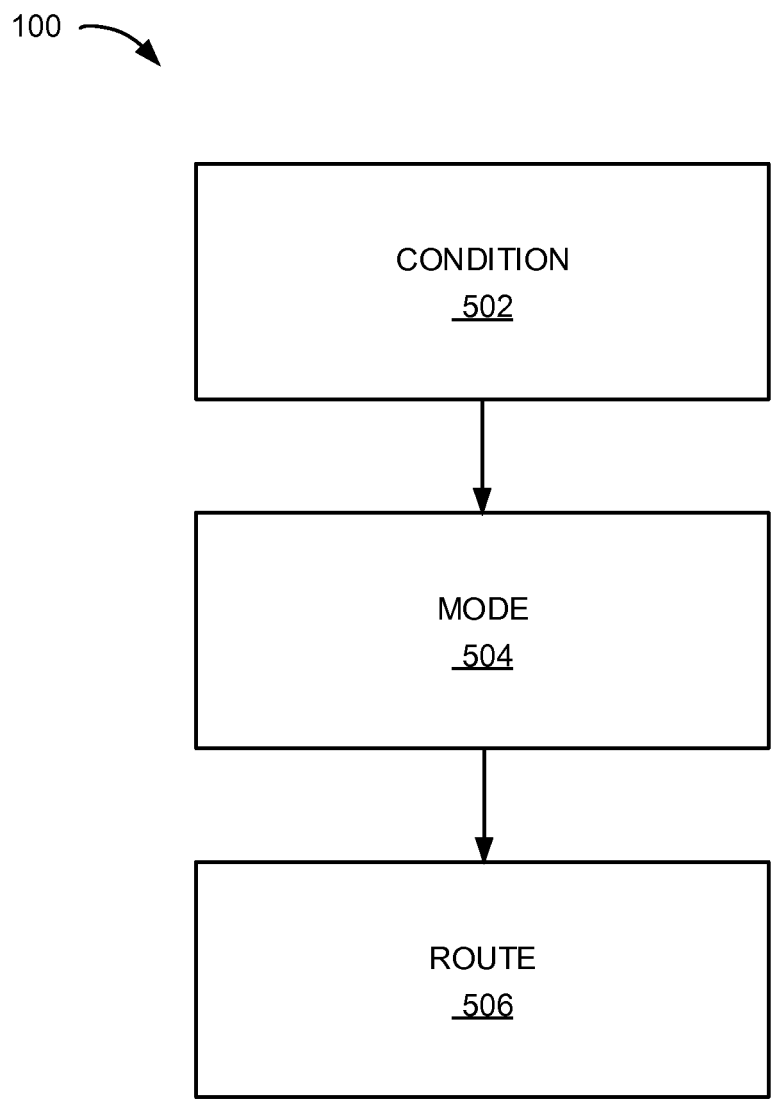
FIG. 5 is a control flow of the navigation system.

Referring now to FIG. 5, therein is shown a control flow of the navigation system 100. The navigation system 100 can include a condition module 502. The condition module 502 determines the travel condition 226 of FIG. 2. For example, the condition module 502 can determine the travel condition 226 representing the travel purpose 224 of FIG. 2.

The condition module 502 can determine the travel condition 226 in a number of ways. For example, the condition module 502 can determine the travel condition 226 representing the travel purpose 224. More specifically, the departure time 238 of FIG. 2 can represent 8 am on a weekday. The activity history 302 of FIG. 3 can represent that the user of the first device 102 of FIG. 1 commutes to work around 8 am on the weekday. As a result, the condition module 502 can determine the travel purpose 224 as commuting to work.

Continuing with the example, the condition module 502 can determine the travel condition 226 representing the travel context 228 of FIG. 2. As stated above, the departure time 238 can represent 8 am. The traffic condition 230 of FIG. 2 can represent heavy traffic. Furthermore, the user's schedule 304 of FIG. 3 can indicate the user having a meeting at 9 am. And the arrival time 240 of FIG. 2 can indicate 8:55 am. As a result, the condition module 502 can determine the travel context 228 to represent user is in a hurry to get to work.

For a different example, the condition module 502 can determine the travel condition 226 based on the candidate route 232 of FIG. 2, the travel distance 234 of FIG. 2, the start location 210 of FIG. 2, the waypoint 212 of FIG. 2, or a combination thereof. For a specific example, the start location 210 can represent a shopping mall. The waypoint 212 can represent the user's home. The condition module 502 can determine the travel condition 226 to represent that the user is going home after shopping.

Continuing with the example, a plurality of the candidate route 232 from the start location 210 to the waypoint 212 can include a plurality of the travel distance 234 of 5 KM, 8 KM, and 10 KM. The condition module 502 can determine the travel condition 226 to include the travel distance 234 exceeding 5 KM to reach the waypoint 212.

Continuing with the example, the user profile 336 of FIG. 3 can represent an elderly with a walking disability. The user profile 336 can include the distance threshold 306 of FIG. 3 as 10 meters for the travel distance 234 walkable by the elderly. The condition module 502 can determine the travel condition 226 of the travel distance 234 from the start location 210 to the waypoint 212 exceeds the distance threshold 306 for the user profile 336.

For further example, the condition module 502 can determine the distance threshold 306, the activity history 302, the travel speed 308 of FIG. 3, or a combination thereof. More specifically, the condition module 502 can determine the distance threshold 306 based on the activity history 302 of the user. As an example, the activity history 302 can indicate that the average instance of the travel speed 308 for the travel distance 234 of less than 500 meters can represent 2 KM/H. For a different example, the activity history 302 can indicate that the average instance of the travel speed 308 for the travel distance 234 of greater than 500 meters can represent greater than 20 KM/H. Based on the activity history 302, the travel speed 308, or a combination thereof, the condition module 502 can determine the distance threshold 306. More specifically, if the travel speed is averaging 2 KM/H, the condition module 502 can determine the distance threshold 308 to represent 500 meters.

For another example, the condition module 502 can determine the travel condition 226 based on the travel option 236 of FIG. 2. More specifically, the travel option 236 can represent the user having the user's vehicle, the other user's vehicle, the public transportation, or a combination thereof available at the start location 210, the waypoint 212, or a combination thereof. As an example, at the start location 210, the user can have the travel option 236 of the public transportation available besides the user's vehicle. As a result, the condition module 502 can determine the travel condition 226 having a plurality of the travel option 236 available at the start location 210.

For another example, the condition module 502 can determine the travel condition 226 based on the fuel condition 312 of FIG. 3. More specifically, the fuel condition 312 of the user's vehicle can be near empty. The user cannot find a refueling station near the start location 210. The condition module 502 can determine the fuel condition 312 to represent that the user's vehicle is low in fuel with no refueling opportunity nearby. The condition module 502 can communicate the travel condition 226 to a mode module 504.

The navigation system 100 can include the mode module 504, which can couple to the condition module 502. The mode module 504 determines the navigation mode 202 of FIG. 2. For example, the mode module 504 can determine the navigation mode 202 with the mode type 204 of FIG. 2 representing the vehicle mode 206 of FIG. 2, the pedestrian mode 208 of FIG. 2, or a combination thereof. Moreover, the mode module 504 can combine the factors discussed below to determine the navigation mode 202.

The mode module 504 can determine the navigation mode 202 in a number of ways. For example, the mode module 504 can determine the navigation mode 202 based on the travel condition 226. More specifically, the mode module 504 can determine the navigation mode 202 based on the travel context 228. As an example, the travel context 228 can represent that the user in in a hurry to get to work. The mode module 504 can determine the navigation mode 202 to represent the mode type 204 to represent the vehicle mode 206.

Continuing with the example, the mode module 504 can determine the navigation mode 202 based on the travel duration 316 of FIG. 3 meeting or exceeding the duration threshold 318 of FIG. 3. More specifically, the mode module 504 can determine the duration threshold 318 based on the travel duration 316 of the travel mode 242 of FIG. 2, the departure time 238, the arrival time 240, or a combination thereof compared to the user's schedule 304. As an example, the user's schedule 304 can represent 9 am meeting. The departure time 238 can represent 8:40 am. As a result, the mode module 504 can determine the duration threshold 318 to represent 20 minutes based on the user's schedule 304, the departure time 238, or a combination thereof.

For further example, the mode module 504 can determine the navigation mode 202 based on the travel duration 316 below the duration threshold 318. The travel duration 316 for the travel mode 242 representing walking can represent 35 minutes with the arrival time 240 of 9:15 am. The travel duration 316 for the travel mode 242 representing driving can represent 15 minutes with the arrival time 240 of 8:55 am. As a result, the mode module 504 can determine the mode type 204 of the navigation mode 202 to represent the vehicle mode 206 based on the travel duration 316 of driving is below the duration threshold 318.

It has been discovered that the navigation system 100 determining the navigation mode 202 based on comparing the travel duration 316 to the duration threshold 318 improves the safety of the user. More specifically, by comparing the travel duration 316 to the duration threshold 318, the navigation system 100 can select the mode type 204 most suited for the travel context 228. As a result, the navigation system 100 can improve the efficiency of operating the navigation system 100, the vehicle, or a combination thereof for improving the safety of the user.

For further example, the mode module 504 can determine the navigation mode 202 based on the duration difference 320 of FIG. 3 meeting or exceeding the difference threshold 322 of FIG. 3. For example, the duration difference 320 between walking to work versus driving to work based on the above example can represent 20 minutes. The mode module 504 can set the difference threshold 322 as 5 minutes. Because the duration difference 320 exceeds the difference threshold 322, the mode module 504 can determine the navigation mode 202 by selecting the mode type 204 with lesser of the travel duration 316. In this example, the mode module 504 can determine the mode type 204 as the vehicle mode 206.

It has been discovered that the navigation system 100 determining the navigation mode 202 based on the duration difference 320 meeting or exceeding the difference threshold 322 can improve the efficiency of selecting the mode type 204 most suited for the user of the navigation system 100. More specifically, the navigation system 100 can determine the navigation mode 202 most preferred by the user if the navigation system 100 can select the mode type 204 based on the duration difference 320 compared to a limit established by the difference threshold 322. As a result, the navigation system 100 can improve the safety of the user operating the navigation system 100, the vehicle, or a combination thereof for selecting the navigation mode 202 most suited to the user.

For a different example, the mode module 504 can determine the navigation mode 202 based on the departure time 238, the arrival time 240, or a combination thereof. As an example, the arrival time 240 can be 12 pm. Since the arrival time 240 is still broad daylight, the mode module 504 can determine the mode type 204 as the pedestrian mode 208. In contrast, if the arrival time 240 is 10 pm at night, the mode module 504 can determine the mode type 204 to represent the vehicle mode 206.

For further example, the mode module 504 can determine the navigation mode 202 based on comparing the departure time 238, the arrival time 240, or a combination thereof to the time of day threshold 324 of FIG. 3. More specifically, the mode module 504 can set the time of day threshold 324 at sunset. If the departure time 238 is before sunset, the mode module 504 can determine the navigation mode 202 to represent the pedestrian mode 208.

Further, the mode module 504 can adjust the time of day threshold 324 based on the travel context 228 of the start location 210, the waypoint 212, or a combination thereof. For example, the crime level 326 of FIG. 3 of the start location 210 can represent high. The mode module 504 can adjust the time of day threshold 324 from 6 pm to 3 pm to improve safety of the user. More specifically, if the departure time 238 is at 4 pm, the mode module 504 can determine the mode type 204 to represent the vehicle mode 206 instead of the pedestrian mode 208.

It has been discovered that the navigation system 100 adjusting the time of day threshold 324 based on the travel context 228 of the start location 210, the waypoint 212, or a combination thereof improves the safety of the user. By considering the travel context 228, such as the crime level 326 of the geographic area, the mode module 504 can determine the navigation mode 202 most suited to the user in the given instance of the travel context 228. As a result, the navigation system 100 can improve the safety of the user operating the navigation system 100, the vehicle, or a combination thereof.

For a different example, the mode module 504 can determine the navigation mode 202 based on the weather condition 328 of FIG. 3. More specifically, the weather condition 328 can be sunny with 20 degrees Celsius. Since the weather condition 328 is good, the mode module 504 can determine the mode type 204 as the pedestrian mode 208. In contrast, if the weather condition 328 is sunny but 35 degrees Celsius, the mode module 504 can determine the mode type 204 to represent the vehicle mode 206.

For further example, the mode module 504 can determine the navigation mode 202 based on the user profile 336 and comparing the weather condition 328 to the weather threshold 330 of FIG. 3. For example, the mode module 504 can set the weather threshold 330 based on precipitation level, temperature, humidity, gust level, or a combination thereof. Continuing with the previous example, the mode module 504 can set the weather threshold 330 representing the temperature at 30 degrees Celsius. Based on the weather condition 328 of the temperature of 35 degrees Celsius exceeding the weather threshold 330, the mode module 504 can determine the mode type 204 to represent the vehicle mode 206. For another example, the mode module 504 can set the weather threshold 330 representing the temperature at 5 degrees Celsius. If the weather condition 328 is below the weather threshold 330, the mode module 504 can determine the mode type 204 to represent the vehicle mode 206.

It has been discovered that the navigation system 100 determining the navigation mode 202 based on comparing the weather condition 328 to the weather threshold 330 improves the safety of the user. The user profile 336 can indicate the level of tolerance of each user for the weather condition 328. By determining the navigation mode 202 tailored to the user profile 336, the navigation system 100 can improve the safety of operating the navigation system 100, the vehicle, or a combination thereof.

For a different example, the mode module 504 can determine the navigation mode 202 based on the candidate route 232. More specifically, a plurality of the candidate route 232 can be available from the start location 210 to the waypoint 212. However, if there is no instance of the candidate route 232 available for a vehicle to traverse, the mode module 504 can determine the mode type 204 to represent the pedestrian mode 208.

For further example, if the plurality of the candidate route 232 includes availability for the walking and driving, the mode module 504 can determine the mode type 204 based on various factors discussed above. For example, the mode module 504 can determine the navigation mode 202 based on the candidate route 232 having the shortest instance of the travel duration 316. If the travel duration 316 is based on the travel mode 242 of operating a vehicle, the mode module 504 can determine the mode type 204 to represent the vehicle mode 206.

For further example, the mode module 504 can determine the navigation mode 202 based on the traffic condition 230 of the candidate route 232. More specifically, if the traffic condition 230 indicates that the speed limit is 100 KM/H, the mode module 504 can determine the mode type 204 to represent the vehicle mode 206. Moreover, the mode module 504 can determine the navigation mode 202 based on the traffic condition 230 meeting or exceeding the speed threshold 310 of FIG. 3. For example, the mode module 504 can set the speed threshold 310 at 40 KM/H. If the traffic condition 230 representing the speed limit of the candidate route 232 is set at 60 KM/H, the mode module 504 can determine the mode type 204 to represent the vehicle mode 206. In contrast, if the traffic condition 230 is below the speed threshold 310, the mode module 504 can determine the mode type 204 to represent the pedestrian mode 208.

It has been discovered that the navigation system 100 determining the navigation mode 202 based on the comparing the traffic condition 230 to the speed threshold 310 can improve the safety of the user. More specifically, each user can have a tolerance level of the traffic speed reflected in the speed threshold 310. By the navigation system 100 comparing the current instance of the traffic condition 230 to the speed threshold 310, the navigation system 100 can determine the navigation mode 202 most suited for the user in the travel context 228 to improve the safety of the user operating the navigation system 100, the vehicle, or a combination thereof.

For further example, the mode module 504 can determine the navigation mode 202 based on the pedestrian accessibility 332 of FIG. 3. More specifically, if the candidate route 232 to the start location 210 to the waypoint 212 includes the pedestrian accessibility 332, the mode module 504 can determine the mode type 204 to represent the pedestrian mode 208. In contrast, if the candidate route 232 does not include the pedestrian accessibility 332, the mode module 504 can determine the mode type 204 to represent the vehicle mode 206.

For another example, the mode module 504 can determine the navigation mode 202 based on the vehicle type 244 of FIG. 2. As an example, the mode module 504 can determine the navigation mode 202 based on the whether the vehicle type 244 represents a carbon emission vehicle, hybrid vehicle, a zero emission vehicle, or a combination thereof. If the duration difference 320 between walking or driving is no difference and the vehicle type 244 the user operates is carbon emission vehicle, the mode module 504 can determine the mode type 204 to represent the pedestrian mode 208.

For another example, the mode module 504 can determine the navigation mode 202 based on the travel purpose 224. As an example, the travel purpose 224 can include fitness, commuting, shopping, vacation, or a combination thereof. The user profile 336 can indicate that the user has a fitness goal of walking 5 kilometers every day. The travel distance 234 between the start location 210 and the waypoint 212 can represent 5 kilometers roundtrip. To meet the user's fitness goal, the mode module 504 can determine the mode type 204 to represent the pedestrian mode 208.

For further example, the user's schedule 304 can indicate that the user does not have a meeting for the rest of the day. To reach the fitness goal, the user may have 2 kilometers remaining out of the 5 kilometers goal for walking. To achieve the fitness goal, the mode module 504 can determine the mode type 204 to represent the pedestrian mode 208 to help user achieve the fitness goal.

For another example, the mode module 504 can determine the navigation mode 202 based on the travel distance 234 meeting or exceeding the distance threshold 306. More specifically, the distance threshold 306 can be set at 500 meters. If the travel distance 234 between the start location 210 and the waypoint 212 meets or exceeds the distance threshold 306, the mode module 504 can determine the mode type 204 to represent the vehicle mode 206. In contrast, if the travel distance 234 is below the distance threshold 306, the mode module 504 can determine the mode type 204 to represent the pedestrian mode 208.

For another example, the mode module 504 can determine the navigation mode 202 based on the parking availability 334 of FIG. 3. As an example, the mode module 504 can determine the mode type 204 to represent the vehicle mode 206 if the parking availability 334 is available at the waypoint 212. The mode module 504 can obtain the parking availability 334 from the external sources, such as parking facility, via the first control interface 422 of FIG. 4. For further example, the mode module 504 can determine the mode type 204 to represent the pedestrian mode 208 if the parking availability 334 representing re-parking is available at the start location 210.

It has been discovered that the navigation system 100 determining the navigation mode 202 based on the parking availability 334 improves the efficiency of selecting the travel mode 242. By determining the navigation mode 202 based on the parking availability 334, the navigation system 100 can reduce the risk of the user searching for parking. As a result, the navigation system 100 can improve the safety and efficiency for operating the navigation system 100, the vehicle, or a combination thereof.

For another example, the mode module 504 can determine the navigation mode 202 based on the travel option 236 available. As an example, the travel option 236 at the waypoint 212 can include public transportation. More specifically, the public transportation can take the user to the final destination. As a result, the mode module 504 can determine the mode type 204 for traveling from the start location 210 to the waypoint 212 can represent the pedestrian mode 208.

For another example, the mode module 504 can determine the navigation mode 202 based on the fuel condition 312 compared to the fuel threshold 314 of FIG. 3. More specifically, if the fuel condition 312 meets or exceeds the fuel threshold 314, the mode module 504 can determine the navigation mode 202 to represent the vehicle mode 206. In contrast, if the fuel condition 312 is below the fuel threshold 314, the mode module 504 can determine the mode type 204 to represent the pedestrian mode 208.

For further example, the mode module 504 can determine the fuel threshold 314 on various factors. The mode module 504 can determine the fuel threshold 314 based on the travel distance 234, the vehicle type 244, the fuel condition 312, or a combination thereof. For a specific example, if the fuel condition 312 is 40 kilometers travelable distance by the vehicle, the mode module 504 can determine the fuel threshold 314 to represent 40 kilometers.

It has been discovered that the navigation system 100 determining the navigation mode 202 based on comparing the fuel condition 312 to the fuel threshold 314 improves the safety of the user. By selecting the mode type 204 on whether the fuel condition 312 meets or exceeds the fuel threshold 314, the navigation system 100 can reduce the risk of the user operating the vehicle may increase the risk of the user losing fuel during operation of the vehicle. As a result, the navigation system 100 can improve the safety of the user by determining the navigation mode 202 most suited for the fuel condition 312.

For another example, the mode module 504 can determine the navigation mode 202 based on the user profile 336. If the user profile 336 as an elderly with walking disability, the mode module 504 can determine the mode type 204 to represent the vehicle mode 206 instead of the pedestrian mode 208. The mode module 504 can communicate the navigation mode 202 to a route module 506.

The navigation system 100 can include the route module 506, which can couple to the mode module 504. The route module 506 generates the travel route 214 of FIG. 2. For example, the route module 506 can generate the travel route 214 based on the navigation mode 202.

The route module 506 can generate the travel route 214 in a number of ways. For example, the route module 506 can generate the route option 216 of FIG. 2 for the travel route 214 representing the vehicle route 218 of FIG. 2, the pedestrian route 220 of FIG. 2, or a combination thereof. More specifically, if the mode type 204 is the vehicle mode 206, the route module 506 can generate the vehicle route 218. If the mode type 204 is the pedestrian mode 208, the route module 506 can generate the pedestrian route 220.

For further example, the travel purpose 224 can represent the user achieving his or her fitness goal. The route module 506 can generate the pedestrian route 220 representing the fitness route 222 of FIG. 2 based on the travel purpose 224, the user's schedule 304, the travel distance 234, or a combination thereof. More specifically, the travel purpose 224 can represent the user running for 20 kilometers to achieve the fitness goal. The user's schedule 304 indicates that the user has no other engagement after the run. The route module 506 can generate a plurality of the fitness route 222 for the user to choose from to achieve the fitness goal.

The physical transformation from moving from the start location 210 to the waypoint 212 results in the movement in the physical world, such as people using the first device 102, the vehicle, or a combination thereof, based on the operation of the navigation system 100. As the movement in the physical world occurs, the movement itself creates additional information that is converted back into determining the navigation mode 202 for the continued operation of the navigation system 100 and to continue the movement in the physical world.

The first software 426 of FIG. 4 of the first device 102 of FIG. 4 can include the modules for the navigation system 100. For example, the first software 426 can include the condition module 502, the mode module 504, and the route module 506.

The first control unit 412 of FIG. 4 can execute the first software 426 for condition module 502 to determine the travel condition 226. The first control unit 412 can execute the first software 426 for the mode module 504 to determine the navigation mode 202. The first control unit 412 can execute the first software 426 for the route module 506 to generate the travel route 214.

The second software 442 of FIG. 4 of the second device 106 of FIG. 4 can include the modules for the navigation system 100. For example, the second software 442 can include the condition module 502, the mode module 504, and the route module 506.

The second control unit 434 of FIG. 4 can execute the second software 442 for condition module 502 to determine the travel condition 226. The second control unit 434 can execute the second software 442 for the mode module 504 to determine the navigation mode 202. The second control unit 434 can execute the second software 442 for the route module 506 to generate the travel route 214.

The modules of the navigation system 100 can be partitioned between the first software 426 and the second software 442. The second software 442 can include the condition module 502 and the mode module 504. The second control unit 434 can execute modules partitioned on the second software 442 as previously described.

The first software 426 can include the route module 506. Based on the size of the first storage unit 414, the first software 426 can include additional modules of the navigation system 100. The first control unit 412 can execute the modules partitioned on the first software 426 as previously described.

The first control unit 412 can operate the first communication interface 428 of FIG. 4 to communicate the travel condition 226, the navigation mode 202, the travel route 214, or a combination thereof to or from the second device 106. The first control unit 412 can operate the first software 426 to operate the location unit 420 of FIG. 4. The second control unit 434 can operate the second communication interface 450 of FIG. 4 to communicate the travel condition 226, the navigation mode 202, the travel route 214, or a combination thereof to or from the first device 102 through the communication path 104 of FIG. 4.

The navigation system 100 describes the module functions or order as an example. The modules can be partitioned differently. For example, the condition module 502 and mode module 504 can be combined. Each of the modules can operate individually and independently of the other modules. Furthermore, data generated in one module can be used by another module without being directly coupled to each other. For example, the route module 506 can receive the travel condition 226 from the condition module 502. Further, "communicating" can represent sending, receiving, or a combination thereof the data generated to or from one to another.

The modules described in this application can be hardware implementation or hardware accelerators in the first control unit 412 or in the second control unit 434. The modules can also be hardware implementation or hardware accelerators within the first device 102 or the second device 106 but outside of the first control unit 412 or the second control unit 434, respectively as depicted in FIG. 4. However, it is understood that the first control unit 412, the second control unit 434, or a combination thereof can collectively refer to all hardware accelerators for the modules.

The modules described in this application can be implemented as instructions stored on a non-transitory computer readable medium to be executed by the first control unit 412, the second control unit 434, or a combination thereof. The non-transitory computer medium can include the first storage unit 414 of FIG. 4, the second storage unit 446 of FIG. 4, or a combination thereof. The non-transitory computer readable medium can include non-volatile memory, such as a hard disk drive, non-volatile random access memory (NVRAM), solid-state storage device (SSD), compact disk (CD), digital video disk (DVD), or universal serial bus (USB) flash memory devices. The non-transitory computer readable medium can be integrated as a part of the navigation system 100 or installed as a removable portion of the navigation system 100.

Figure 6:
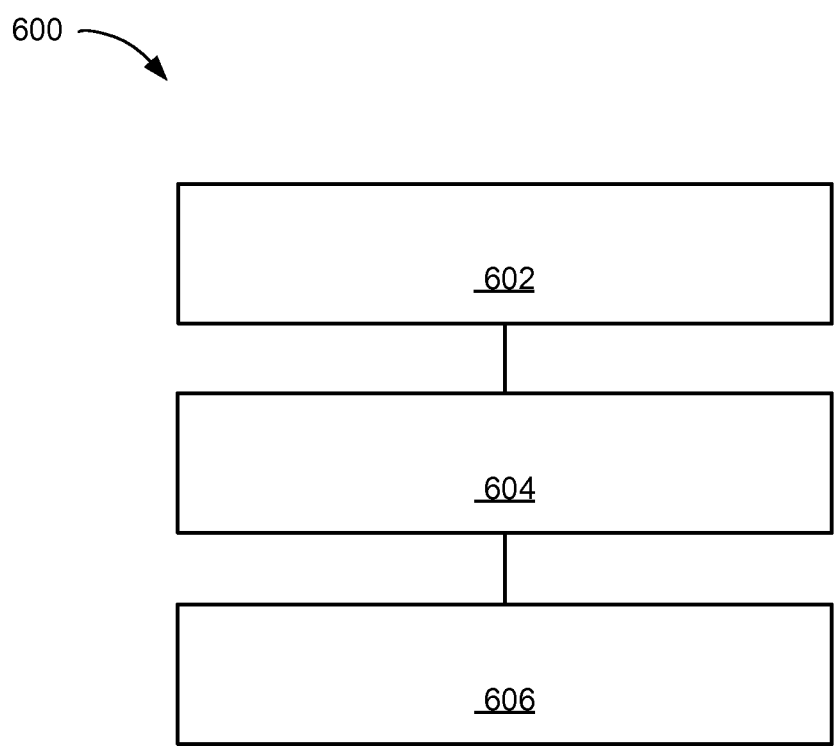
FIG. 6 is a flow chart of a method of operation of the navigation system in a further embodiment of the present invention.

Referring now to FIG. 6, therein is shown a flow chart of a method 600 of operation of the navigation system 100 in a further embodiment of the present invention. The method 600 includes: determining a travel condition for traveling from a start location to a waypoint in a block 602; determining a navigation mode based on the travel condition by comparing a travel distance, from the start location to the waypoint, to a distance threshold for selecting a mode type in a block 604; and generating a travel route with a control unit based on the navigation mode for displaying on a device in a block 606.

The resulting method, process, apparatus, device, product, and/or system is straightforward, cost-effective, uncomplicated, highly versatile, accurate, sensitive, and effective, and can be implemented by adapting known components for ready, efficient, and economical manufacturing, application, and utilization. Another important aspect of the present invention is that it valuably supports and services the historical trend of reducing costs, simplifying systems, and increasing performance. These and other valuable aspects of the present invention consequently further the state of the technology to at least the next level.

While the invention has been described in conjunction with a specific best mode, it is to be understood that many alternatives, modifications, and variations will be apparent to those skilled in the art in light of the aforegoing description. Accordingly, it is intended to embrace all such alternatives, modifications, and variations that fall within the scope of the included claims. All matters hithertofore set forth herein or shown in the accompanying drawings are to be interpreted in an illustrative and non-limiting sense.

What is claimed is:

1. A method of operation of a navigation system comprising:
    determining a travel condition for traveling from a start location to a waypoint;
    determining a navigation mode based on a duration difference, representing a difference between one instance of a travel duration and another instance of the travel duration, meeting or exceeding a difference threshold, representing a maximum allotted time difference, for selecting a mode type; and
    generating a travel route with a control unit based on the navigation mode for displaying on a device.

2. The method as claimed in claim 1 wherein determining the navigation mode includes determining the navigation mode based on the travel duration meeting or exceeding a duration threshold for selecting the mode type.

3. The method as claimed in claim 1 wherein determining the navigation mode includes determining the navigation mode based on the travel condition by comparing a travel distance, from the start location to the waypoint, to a distance threshold defined in a user profile for selecting the mode type.

4. The method as claimed in claim 1 wherein determining the navigation mode includes determining the navigation mode based on comparing a departure time, an arrival time, or a combination thereof to a time of day threshold for selecting the mode type.

5. The method as claimed in claim 1 wherein determining the navigation mode includes determining the navigation mode based on comparing a weather condition to a weather threshold for selecting the mode type.

6. The method as claimed in claim 1 wherein determining the navigation mode includes determining the navigation mode based on comparing a traffic condition meeting or exceeding a speed threshold for selecting the mode type.

7. The method as claimed in claim 1 wherein determining the navigation mode includes determining the navigation mode based on a parking availability at the start location, the waypoint, or a combination thereof for selecting the mode type.

8. The method as claimed in claim 1 wherein determining the navigation mode includes determining the navigation mode based on comparing a fuel condition to a fuel threshold for selecting the mode type.

9. The method as claimed in claim 1 wherein determining the navigation mode includes determining the navigation mode based on a pedestrian accessibility for selecting the mode type.

10. The method as claimed in claim 1 wherein determining the navigation mode includes determining the navigation mode based on a travel purpose for selecting the mode type.

11. A navigation system comprising:
    a control unit for:
        determining a travel condition for traveling from a start location to a waypoint,
        determining a navigation mode based on a duration difference, representing a difference between one instance of a travel duration and another instance of the travel duration, meeting or exceeding a difference threshold, representing a maximum allotted time difference, for selecting a mode type,
        generating a travel route based on the navigation mode, and
    a communication interface, coupled to the control unit, for communicating the travel route for displaying on a device.

12. The system as claimed in claim 11 wherein the control unit is for determining the navigation mode based on the travel duration meeting or exceeding a duration threshold for selecting the mode type.

13. The system as claimed in claim 11 wherein the control unit is for determining the navigation mode based on the travel condition by comparing a travel distance, from the start location to the waypoint, to a distance threshold defined in a user profile for selecting the mode type.

14. The system as claimed in claim 11 wherein the control unit is for determining a result sufficiency based on a user response to the point of interest ranking presented.

15. The system as claimed in claim 11 wherein the control unit is for determining the navigation mode based on comparing a departure time, an arrival time, or a combination thereof to a time of day threshold for selecting the mode type.

16. A non-transitory computer readable medium including instructions for execution, the instructions comprising:
   determining a travel condition for traveling from a start location to a waypoint;
   determining a navigation mode based on a duration difference, representing a difference between one instance of a travel duration and another instance of the travel duration, meeting or exceeding a difference threshold, representing a maximum allotted time difference, for selecting a mode type; and
   generating a travel route based on the navigation mode for displaying on a device.

17. The non-transitory computer readable medium as claimed in claim 16 wherein determining the navigation mode includes determining the navigation mode based on the travel duration meeting or exceeding a duration threshold for selecting the mode type.

18. The non-transitory computer readable medium as claimed in claim 16 wherein determining the navigation mode includes determining the navigation mode based on the travel condition by comparing a travel distance, from the start location to the waypoint, to a distance threshold defined in a user profile for selecting the mode type.

19. The non-transitory computer readable medium as claimed in claim 16 wherein determining the navigation mode includes determining the navigation mode based on comparing a departure time, an arrival time, or a combination thereof to a time of day threshold for selecting the mode type.

20. The non-transitory computer readable medium as claimed in claim 16 wherein determining the navigation mode includes determining the navigation mode based on comparing a weather condition to a weather threshold for selecting the mode type.

* * * * *